United States Patent
Shirakata et al.

(10) Patent No.: US 8,568,928 B2
(45) Date of Patent: Oct. 29, 2013

(54) NON-AQUEOUS ELECTROLYTE SECONDARY BATTERY

(75) Inventors: Hironori Shirakata, Moriguchi (JP); Koji Hasumi, Saitama (JP); Hiroyuki Akita, Kobe (JP); Kazunori Donoue, Moriguchi (JP); Yoshinori Kida, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 884 days.

(21) Appl. No.: 11/976,088

(22) Filed: Oct. 19, 2007

(65) Prior Publication Data

US 2008/0096098 A1 Apr. 24, 2008

(30) Foreign Application Priority Data

Oct. 19, 2006 (JP) .................................. 2006-285283
Dec. 27, 2006 (JP) .................................. 2006-350735

(51) Int. Cl.
*H01M 4/13* (2010.01)

(52) U.S. Cl.
USPC ........................................ 429/232; 429/218.1

(58) Field of Classification Search
USPC .................... 429/94, 231.95, 209, 232, 218.1
See application file for complete search history.

(56) References Cited

U.S. PATENT DOCUMENTS

| | | | |
|---|---|---|---|
| 6,232,012 B1 * | 5/2001 | Howard et al. | 429/94 |
| 2002/0041998 A1 | 4/2002 | Hosoya et al. | 429/221 |
| 2002/0102459 A1 | 8/2002 | Hosoya et al. | 429/221 |
| 2003/0232247 A1 * | 12/2003 | Loffler et al. | 429/232 |
| 2005/0233219 A1 * | 10/2005 | Gozdz et al. | 429/231.95 |
| 2007/0202410 A1 * | 8/2007 | Takeuchi et al. | 429/232 |

FOREIGN PATENT DOCUMENTS

JP   11-176446 A   7/1999

* cited by examiner

*Primary Examiner* — Milton I Cano
*Assistant Examiner* — Stephen Yanchuk
(74) *Attorney, Agent, or Firm* — McDermott Will & Emery LLP (57) ABSTRACT

A non-aqueous electrolyte secondary battery has a positive electrode (1), a negative electrode (2), and a non-aqueous electrolyte. The positive electrode has a positive electrode mixture layer containing a positive electrode active material, a binder agent, and a conductive agent. The positive electrode active material in the positive electrode mixture layer contains an olivine-type lithium-containing metal phosphate represented by the general formula $Li_xMPO_4$, where M is at least one element selected from the group consisting of Co, Ni, Mn, and Fe, and x is $0<x<1.3$. The conductive agent in the positive electrode mixture layer is composed of a mixture of carbon particles and carbon fiber.

17 Claims, 5 Drawing Sheets

NON-AQUEOUS ELECTROLYTE SECONDARY BATTERY

BACKGROUND OF THE INVENTION

1. Field of the Invention

The present invention relates to a non-aqueous electrolyte secondary battery comprising a negative electrode, a non-aqueous electrolyte, and a positive electrode having a positive electrode mixture layer containing a positive electrode active material, a binder, and a conductive agent. More particularly, the invention relates to such a non-aqueous electrolyte secondary battery employing a positive electrode containing an olivine-type lithium-containing metal phosphate as the positive electrode active material that exhibits improved discharge performance and charge-discharge cycle performance at high current discharge.

2. Description of Related Art

In recent years, non-aqueous electrolyte secondary batteries have been widely in use as a new type of high power, high energy density secondary battery. Non-aqueous electrolyte secondary batteries typically use a non-aqueous electrolyte and perform charge-discharge operations by transferring lithium ions between the positive electrode and the negative electrode.

Generally, these types of non-aqueous electrolyte secondary batteries often use positive electrode active materials such as lithium cobalt oxide $LiCoO_2$, spinel lithium manganese oxide $LiMn_2O_4$, and lithium-containing metal composite oxides represented by the general formula $LiNi_aCo_bMn_cO_2$ (wherein a+b+c=1).

However, there have been some problems with this type of non-aqueous electrolyte secondary battery. For example, since the positive electrode active material contains scarce natural resources such as cobalt, manufacturing costs tend to be high and it is difficult to ensure a stable supply.

In recent years, the use of an olivine-type lithium-containing metal phosphate represented by the general formula $Li_xMPO_4$, where M is at least one element selected from the group consisting of Co, Ni, Mn, and Fe, and 0<x<1.3, has been considered as an alternative to the above-mentioned positive electrode active materials.

The olivine-type lithium-containing metal phosphate, however, has a very high electrical resistance. The non-aqueous electrolyte secondary battery that uses the olivine-type lithium-containing metal phosphate as the positive electrode active material in its positive electrode shows a high resistance overvoltage and a low battery voltage when discharged at high current. Therefore, sufficient battery performance cannot be obtained.

In view of this problem, various proposals have been made in recent years for the batteries that use an olivine-type lithium iron phosphate, one type of the olivine-type lithium-containing metal phosphate, for the positive electrode. For example, Japanese Published Unexamined Patent Application No. 2002-110162 proposes a positive electrode active material that uses a composite material of lithium iron phosphate and a carbon material. Japanese Published Unexamined Patent Application No. 2002-110165 proposes a method of producing a positive electrode active material in which the contact area of lithium iron phosphate with a conductive agent is increased by reducing the particle size of the lithium iron phosphate.

Nevertheless, even when a composite material of lithium iron phosphate and a carbon material is used for the positive electrode active material or the particle size of lithium iron phosphate is reduced to increase the contact area of the lithium iron phosphate and a conductive agent as described above, the battery performance at high current discharge has not been improved sufficiently, and problems have remained such as the deterioration in charge-discharge cycle performance at high current discharge.

Another problem is that when the amount of the conductive agent added to the positive electrode is increased in order to reduce the electrical resistance of the positive electrode that uses the olivine-type lithium iron phosphate as the positive electrode active material, the relative proportion of the positive electrode active material in the positive electrode reduces, and consequently, the battery capacity becomes insufficient.

Furthermore, the following problems arise when lumped, or massive, carbon ("kaijo tanso") is used as the conductive agent in the above-described positive electrode; the positive electrode mixture slurry used in preparing the positive electrode shows poor coatability, and the positive electrode shows a large volumetric change after the initial charge-discharge process. As a consequence, the conductive path originating from the lumped carbon is disconnected, and the electrical resistance in the positive electrode cannot be reduced sufficiently. In addition, the charge-discharge cycle performance deteriorates due to the heat produced during high current discharge. On the other hand, when carbon fiber is used as the conductive agent in the positive electrode, it is difficult to reduce the internal resistance of the battery below a certain level, and the battery performance at high current discharge cannot improve sufficiently.

BRIEF SUMMARY OF THE INVENTION

It is an object of the present invention to resolve the foregoing and other problems in the non-aqueous electrolyte secondary battery comprising a negative electrode, a non-aqueous electrolyte, and a positive electrode having a positive electrode mixture layer containing a positive electrode active material, a binder, and a conductive agent, the positive electrode active material containing an olivine-type lithium-containing metal phosphate, which has a high electrical resistance, and to improve the discharge performance and the charge-discharge cycle performance at high current discharge.

In order to accomplish the foregoing and other objects, the present invention provides a non-aqueous electrolyte secondary battery comprising: a negative electrode; a non-aqueous electrolyte; and a positive electrode having a positive electrode mixture layer comprising a positive electrode active material, a binder agent, and a conductive agent, wherein: the positive electrode active material of the positive electrode mixture layer comprises an olivine-type lithium-containing metal phosphate represented by the general formula $Li_xMPO_4$, where M is at least one element selected from the group consisting of Co, Ni, Mn, and Fe, and x is 0<x<1.3; and the conductive agent of the positive electrode mixture layer comprises a mixture of lumped, or massive, carbon particles and carbon fiber.

In the non-aqueous electrolyte secondary battery of the present invention, the olivine-type lithium-containing metal phosphate is used for the positive electrode active material of the positive electrode mixture layer containing the positive electrode active material, a binder agent, and the conductive agent as described above, and in addition, a mixture of lumped, or massive, carbon particles and carbon fiber is used for the conductive agent of the positive electrode mixture layer. In the particles, the diffusion rate of lithium in the olivine-type lithium-containing metal phosphate is slower than that in conventional lithium-containing metal composite oxides, such as lithium cobalt oxide and spinel lithium manganese oxide. For this reason, the particle size needs to be reduced so that the lithium diffusion path can be shortened and accordingly good output power characteristics can be obtained. In the present invention, using lumped carbon as a conductive agent makes it possible to form the conductive paths desirably between the olivine-type lithium-containing metal phosphate particles that have a small particle size. When the positive electrode that employs an olivine-type lithium-containing metal phosphate as the positive electrode active material undergoes an initial charge-discharge process, the positive electrode suffers a large volumetric change. Consequently, the conductive paths formed by the lumped carbon are disconnected because of the volumetric change, for example, associated with charge-discharge operations. In the present invention, the additional use of carbon fiber as a conductive agent prevents the disconnection of the conductive paths formed between the particles and thereby makes it possible to reduce the electrical resistance in the positive electrode sufficiently. Thus, it becomes possible to improve the discharge performance and so forth during high current discharge.

Furthermore, in the non-aqueous electrolyte secondary battery of the present invention, the carbon fiber serves to release the heat produced by high current discharge quickly so as not to remain inside. Thus, the charge-discharge cycle performance at high current discharge can also be improved.

DETAILED DESCRIPTION OF THE INVENTION

A non-aqueous electrolyte secondary battery according to the present invention comprises a negative electrode, a non-aqueous electrolyte, and a positive electrode having a positive electrode mixture layer comprising a positive electrode active material, a binder agent, and a conductive agent. The positive electrode active material of the positive electrode comprises an olivine-type lithium-containing metal phosphate represented by the general formula $Li_xMPO_4$, where M is at least one element selected from the group consisting of Co, Ni, Mn, and Fe, and x is $0<x<1.3$. The conductive agent of the positive electrode mixture layer comprises a mixture of lumped, or massive, carbon ("kaijo tanso") particles (hereinafter sometimes simply: carbon particles) and carbon fiber.

In the non-aqueous electrolyte secondary battery of the present invention, it is preferable that the positive electrode active material of the positive electrode be an olivine-type lithium iron phosphate represented by the general formula $Li_xFePO_4$, where x is $0<x<1.3$, which has a relatively low charge potential, particularly from the viewpoint of ensuring sufficient output power during charge.

In order to shorten the lithium diffusion path and obtain good output power characteristics, it is preferable that the olivine-type lithium-containing metal phosphate have an average particle size of 10 μm or less, and more preferably 5 μm or less. The lower limit of the average particle size of the olivine-type lithium-containing metal phosphate is preferably 0.05 μm.

In addition, in the non-aqueous electrolyte secondary battery of the present invention, it is preferable to use carbon black, which is a commonly used conductive agent, as the carbon particles in the conductive agent of the positive electrode. Examples of the carbon black include acetylene black and Ketjen Black. In addition, examples of the carbon fiber used in the conductive agent of the positive electrode include carbon nanofibers and vapor grown carbon fibers. The carbon fibers preferably have a diameter of 50-300 nm, a length of 5-100 μm and a specific surface area of 30 $m^2/g$ or less.

In the non-aqueous electrolyte secondary battery of the present invention, if the amount of the conductive agent in the positive electrode mixture layer is too small when adding the above-described conductive agent comprising a mixture of carbon particles and carbon fiber to the positive electrode mixture layer, it will be difficult to reduce the electrical resistance of the positive electrode mixture layer sufficiently. Moreover, if the filling density is increased in order to reduce the electrical resistance, the non-aqueous electrolyte solution will be difficult to infiltrate into the positive electrode mixture layer, and diffusion of lithium ions during high current charge and discharge becomes slow, resulting in poor cycle performance. On the other hand, if the amount of the conductive agent in the positive electrode mixture layer is too large, the relative proportion of the positive electrode active material in the positive electrode mixture layer will be so small that a sufficient battery capacity cannot be obtained, and also the coatability of the positive electrode mixture slurry used in preparing the positive electrode will be poor. For these reasons, it is preferable that the amount of the conductive agent in the positive electrode mixture layer be within the range of from 5 wt. % to 20 wt. %.

If the amount of the carbon particles used in the conductive agent is too small, the electrical resistance of the positive electrode mixture layer will be difficult to reduce sufficiently. On the other hand, if the amount of the carbon particles is too large, the coatability of the positive electrode mixture slurry used for preparing the positive electrode will be poor. Therefore, it is preferable that the amount of the carbon particles in the positive electrode mixture layer be within the range of from 2 wt. % to 8 wt. %.

In the non-aqueous electrolyte secondary battery of the present invention, if the filling density of the positive electrode mixture layer is too high when forming the positive electrode mixture layer containing a positive electrode active material, a conductive agent, and a binder agent as described above, the non-aqueous electrolyte solution will be difficult to infiltrate into the positive electrode mixture layer, and the diffusion of lithium ions during high current charge and discharge will be slow, resulting in cycle performance degradation. On the other hand, if the filling density of the positive electrode mixture layer is too low, the contact between the positive electrode active material and the conductive agent cannot be ensured sufficiently, and the electrical resistance becomes high. For these reasons, it is preferable that the filling density of the positive electrode mixture layer be within the range of from 1.7 g/cm$^3$ to 2.1 g/cm$^3$.

In the non-aqueous electrolyte secondary battery of the present invention, the above-described positive electrode mixture layer is applied to a positive electrode current collector to prepare the positive electrode. In this process, if the amount of the positive electrode mixture applied is too large and the positive electrode mixture layer consequently becomes too thick, the reaction will become non-uniform across the thickness when charged and discharged at a high current, resulting in cycle performance degradation. On the other hand, if the amount of the positive electrode mixture applied is too small and the positive electrode mixture layer accordingly becomes too thin, a sufficient battery capacity cannot be obtained. For these reasons, it is preferable that the amount of the positive electrode mixture applied per one side of the positive electrode current collector be within the range of from 70 g/m$^2$ to 125 g/m$^2$, and more preferably within the range of from 80 g/m$^2$ to 115 g/m$^2$.

In the non-aqueous electrolyte secondary battery of the present invention, at least one current collector tab is attached to each of the positive electrode and the negative electrode, and it is preferable to attach two or more current collector tabs to at least one of the positive electrode and the negative electrode, in order to prevent non-uniform reactions along the longitudinal directions of the positive electrode and the negative electrode, which consequently cause cycle performance deterioration.

When two or more current collector tabs are attached to at least one of the positive electrode and the negative electrode in cases where the positive electrode and the negative electrode are wound together with a separator interposed therebetween, it is preferable that the two current collector tabs are attached respectively to two locations of the negative electrode that do not face the positive electrode mixture layer of the positive electrode, the two locations being starting (inner) and terminating (outer) ends of the negative electrode in the resultant winding (referred to hereinafter as the winding starting end and the winding terminating end), in order to prevent the amount of the positive electrode mixture applied to the positive electrode from reducing and to prevent lithium dendrites from forming on the negative electrode due to the charge and discharge operations.

In the non-aqueous electrolyte secondary battery of the present invention, the non-aqueous electrolyte may be any non-aqueous electrolyte that is commonly used for non-aqueous electrolyte secondary batteries. Examples include a non-aqueous electrolyte solution in which a solute is dissolved in a non-aqueous solvent, and a gelled polymer electrolyte in which the just-mentioned non-aqueous electrolyte solution is impregnated in a polymer electrolyte such as polyethylene oxide or polyacrylonitrile.

In addition, the non-aqueous solvent for the non-aqueous electrolyte may be any non-aqueous solvent that is commonly used for non-aqueous electrolyte secondary batteries. Examples of the non-aqueous solvent include cyclic carbonates such as ethylene carbonate, propylene carbonate, butylene carbonate, and vinylene carbonate; and chain carbonates such as dimethyl carbonate, methyl ethyl carbonate, and diethyl carbonate. A mixed solvent of a cyclic carbonate and a chain carbonate is particularly preferable.

The solute that is to be dissolved in the non-aqueous solvent may also be any solute that is commonly used for non-aqueous electrolyte secondary batteries. Examples include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $L"_2B_{10}Cl_{10}$, $L"_2B_{12}Cl_{12}$, and mixtures thereof. In addition to these lithium salts, it is preferable that the non-aqueous electrolyte contain a lithium salt having an oxalato complex as anions. An example of the lithium salt having an oxalato complex as anions is lithium bis(oxalato) borate.

The negative electrode active material used for the negative electrode in the non-aqueous electrolyte secondary battery of the present invention is not particularly limited, but it is preferable that a carbon material such as graphite and hard carbon be used as the negative electrode active material.

EXAMPLES

Herein below, the non-aqueous electrolyte secondary battery according to the present invention will be described in detail with reference to the examples. In addition, it will be demonstrated, by comparisons with the comparative examples and the reference examples, that the non-aqueous electrolyte secondary batteries according to the invention as illustrated in the examples make it possible to improve discharge performance and charge-discharge cycle performance in the case of performing high current discharge even when the positive electrode active material in the positive electrode mixture layer employs an olivine-type lithium-containing metal phosphate, which has a high electrical resistance. It should be construed, however, that the non-aqueous electrolyte secondary battery according to the present invention is not limited to the following examples, but various changes and modifications are possible without departing from the scope of the invention.

Example 1

Figure 3:
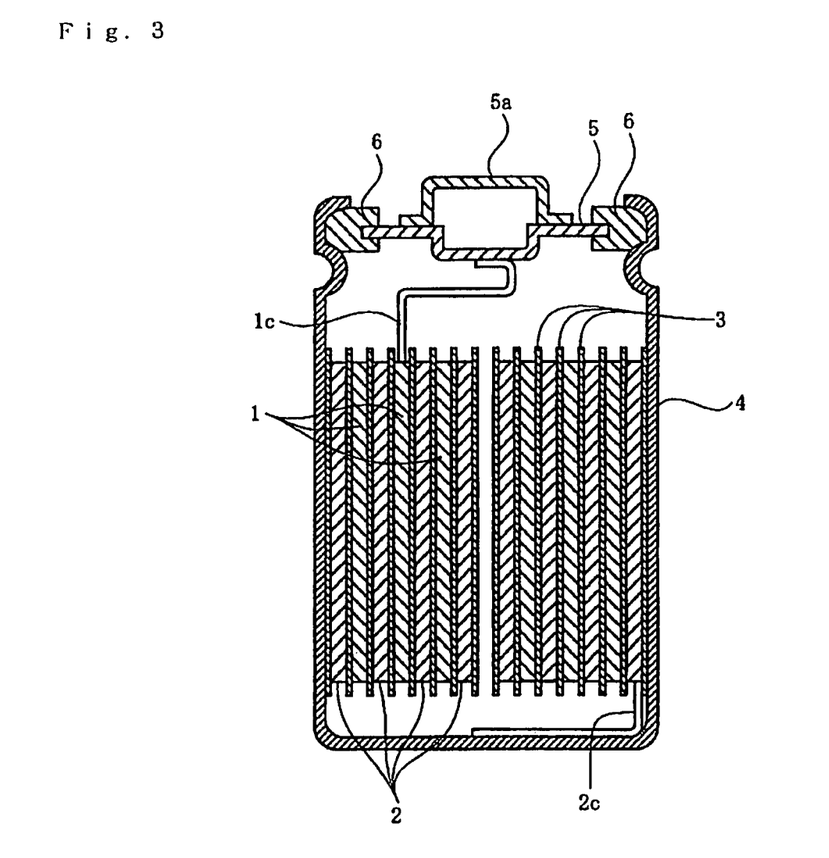
FIG. 3 is a schematic cross-sectional view illustrating a non-aqueous electrolyte secondary battery fabricated in Examples 1-5 of the present invention, Comparative Examples 1 and 2, and Reference Examples 1 and 2.

In Example 1, a cylindrical non-aqueous electrolyte secondary battery as illustrated in FIG. 3 that had a battery capacity of 1000 mAh was fabricated using a positive electrode, a negative electrode, and a non-aqueous electrolyte solution that were prepared in the following manner.

Preparation of Positive Electrode

To prepare the positive electrode, an olivine-type lithium iron phosphate ($LiFePO_4$) was used as the positive electrode active material and was obtained in the following manner. Starting materials, iron phosphate octahydrate $Fe_3(PO_4)_2 \cdot 8H_2O$ and lithium phosphate $Li_3PO_4$, were mixed at a mole ratio of 1:1, and the mixture was put into a 10 cm-diameter stainless steel pot, along with 1 cm-diameter stainless steel balls, and kneaded for 12 hours with a planetary ball mill that was operated under the following conditions: radius of revolution: 30 cm, revolution speed: 150 rpm, and rotation speed: 150 rpm. Then, the resultant material was sintered in an electric furnace in a non-oxidizing atmosphere at 600° C. for 10 hours, then pulverized, and classified, whereby lithium iron phosphate ($LiFePO_4$) with an average particle size of 100 nm was obtained.

Carbon black having an average particle size of 50 nm, and carbon fiber having a fiber diameter of 150 nm and a fiber length of 15 μm were used to form a conductive agent.

Figure 1:
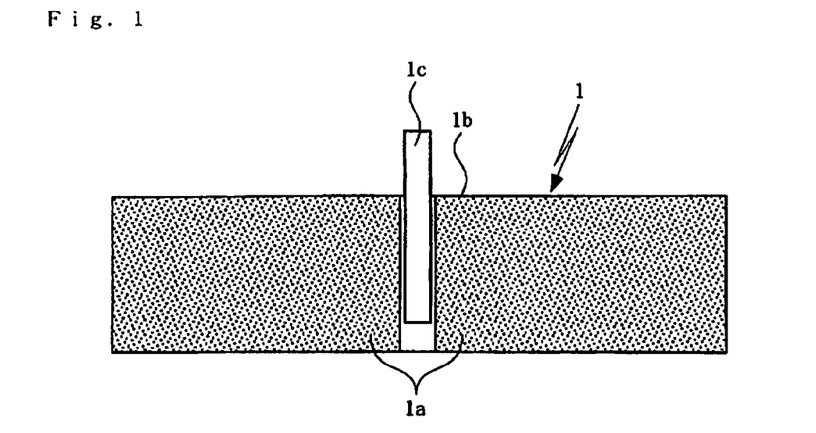
FIG. 1 is a schematic plan view illustrating a positive electrode fabricated in Examples 1-10 of the present invention, Comparative Examples 1 and 2, and Reference Examples 1 and 2.

The positive electrode active material made of the $LiFePO_4$, the carbon black, the carbon fiber, and an N-methyl-2-pyrrolidone solution in which polyvinylidene fluoride binder agent was dissolved were mixed together so that the weight ratio of the positive electrode active material, the carbon black, the carbon fiber, and the binder agent was 85:5:5:5, to thus prepare a positive electrode mixture slurry. The resultant positive electrode mixture slurry was applied onto both sides of a positive electrode current collector made of an aluminum foil and then dried. Thereafter, the resultant material was pressure-rolled with pressure rollers. Thus, a positive electrode 1 in which a positive electrode mixture layer 1a was formed on both side of a positive electrode current collector 1b was obtained.

Then, as illustrated in FIG. 1, using the positive electrode 1, in which the positive electrode mixture layer 1a was formed on both sides of the positive electrode current collector 1b, a positive electrode current collector tab 1c was attached at the longitudinal center part of the positive electrode 1.

In this positive electrode, the amount of the positive electrode mixture applied per one side of the positive electrode current collector was controlled to be 100 g/m², so the amount of the positive electrode mixture applied on both sides of the positive electrode current collector was 200 g/m².

The specific resistance across the thickness of the positive electrode mixture layer of the positive electrode prepared in the above-described manner was measured with a resistance meter (MCP-T600 made by Mitsubishi Chemical Corp.). The specific resistance was found to be 0.53 Ω·m, as shown in Table 1 below.

Preparation of Negative Electrode

Figure 2:
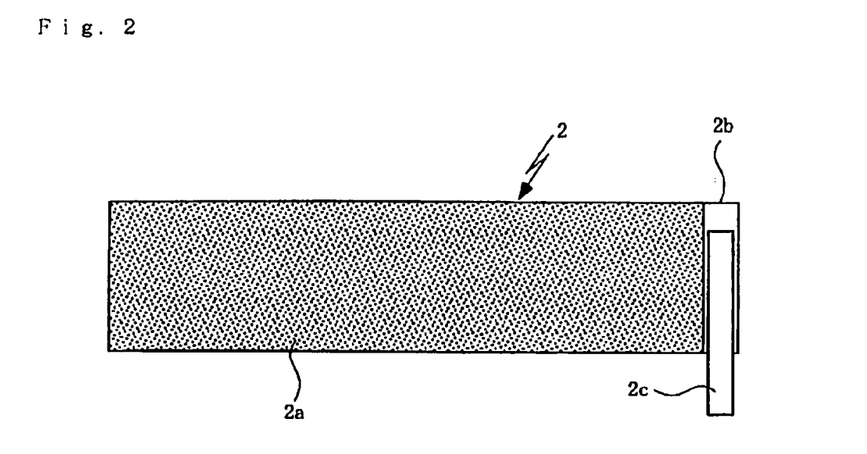
FIG. 2 is a schematic plan view illustrating a negative electrode fabricated in Examples 1-5 of the present invention, Comparative Examples 1 and 2, and Reference Examples 1 and 2.

The negative electrode was prepared in the following manner. Graphite (natural carbon) having a mean particle diameter of 15 μm as a negative electrode active material, styrene-butadiene rubber as a binder agent, and an aqueous solution in which carboxymethyl cellulose as a thickening agent was dissolved, were mixed together so that the weight ratio of the negative electrode active material, the binder agent, and the thickening agent was 98:1:1, and the mixture was kneaded together to prepare a negative electrode slurry. The prepared negative electrode slurry was applied onto both sides of a negative electrode current collector made of a copper foil, and then dried. Thereafter, the resultant material was pressure-rolled by pressure rollers, to thus obtain a negative electrode 2 in which a negative electrode mixture layer 2a was formed on both sides of the negative electrode current collector 2b.

Then, as illustrated in FIG. 2, using the negative electrode 2, in which the negative electrode mixture layer 2a was formed on both sides of the negative electrode current collector 2b, a negative electrode current collector tab 2c was attached to one longitudinal end of the negative electrode 2.

In this negative electrode, the amount of the negative electrode mixture applied per one side of the negative electrode current collector was controlled to be 40 g/m², so that the amount of the negative electrode mixture applied on both sides of the negative electrode current collector was 80 g/m².

Preparation of Non-Aqueous Electrolyte $LiPF_6$ as a solute was dissolved at a concentration of 1.6 mole/L in a mixed solvent of 1:1 volume ratio of ethylene carbonate and diethyl carbonate, which are non-aqueous solvents, to prepare a non-aqueous electrolyte.

Preparation of Battery

The battery was prepared in the following manner. As illustrated in FIG. 3, a microporous polyethylene film, serving as a separator 3, that allows lithium ions to pass through, was interposed between the positive electrode 1 and the negative electrode 2, which were prepared in the above-described manner. These were spirally wound together and accommodated into a battery can 4 so that the negative electrode current collector tab 2c provided on the negative electrode 2 was placed at the winding terminating end. The positive electrode current collector tab 1c, provided on the positive electrode 1, was connected to a positive electrode cap 5 on which a positive electrode external terminal 5a was provided, and the negative electrode current collector tab 2c, provided on the negative electrode 2, was connected to the battery can 4. Then, the battery can 4 was filled with the above-described non-aqueous electrolyte solution and then sealed, and the battery can 4 and the positive electrode cap 5 were electrically isolated by an insulative packing 6.

Example 2

In Example 2, a non-aqueous electrolyte secondary battery was fabricated in the same manner as described in Example 1 except that the positive electrode active material, the carbon black, the carbon fiber, and the binder agent were mixed at a weight ratio of 85:3:7:5 when preparing the positive electrode as described in Example 1.

The specific resistance across the thickness of the positive electrode mixture layer of the positive electrode prepared in Example 2 was measured in the same manner as described in Example 1 above. As a result, the specific resistance was found to be 0.68 Ω·m, as shown in Table 1 below.

Example 3

In Example 3, a non-aqueous electrolyte secondary battery was fabricated in the same manner as described in Example 1, except that the positive electrode active material, the carbon black, the carbon fiber, and the binder agent were mixed at a weight ratio of 87:5:3:5 when preparing the positive electrode as described in Example 1, and that the solute $LiPF_6$ was dissolved at a concentration of 1.0 mole/liter in a mixed solvent of 1:1 volume ratio of ethylene carbonate and diethyl carbonate when preparing the non-aqueous electrolyte solution as described in Example 1.

The specific resistance across the thickness of the positive electrode mixture layer of the positive electrode prepared in Example 3 was measured in the same manner as described in Example 1 above. As a result, the specific resistance was found to be 0.96 Ω·m, as shown in Table 1 below.

Example 4

In Example 4, a non-aqueous electrolyte secondary battery was fabricated in the same manner as described in Example 1, except that the positive electrode active material, the carbon black, the carbon fiber, and the binder agent were mixed at a weight ratio of 87:3:5:5 when preparing the positive electrode as described in Example 1.

The specific resistance across the thickness of the positive electrode mixture layer of the positive electrode prepared in Example 4 was measured in the same manner as described in Example 1 above. As a result, the specific resistance was found to be 0.96 Ω·m, as shown in Table 1 below.

Example 5

In Example 5, a non-aqueous electrolyte secondary battery was fabricated in the same manner as described in Example 1 above, except that the same non-aqueous electrolyte solution as described in Example 3 above was used.

The specific resistance across the thickness of the positive electrode mixture layer of the positive electrode prepared in Example 5 was 0.53 Ω·m, which was the same as that of Example 1 above.

Example 6

Figure 4:
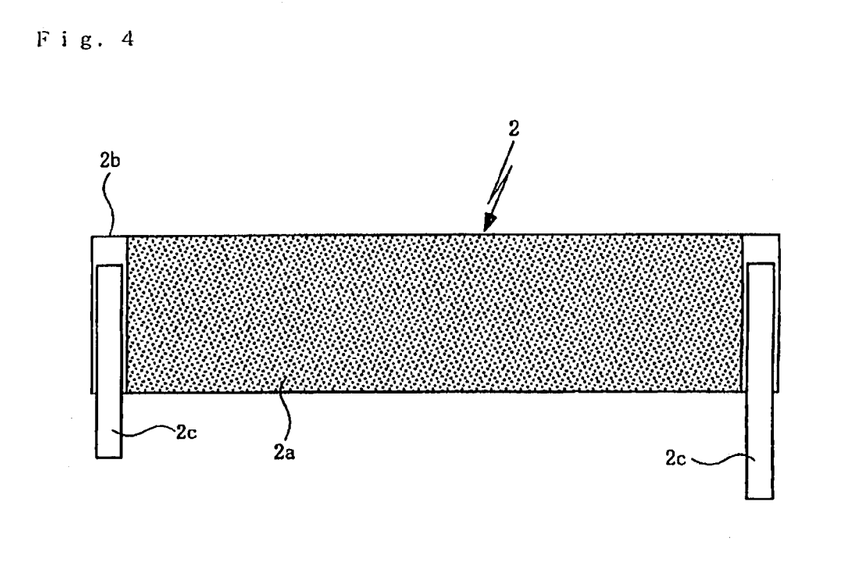
FIG. 4 is a schematic plan view illustrating a negative electrode fabricated in Examples 6-10 of the present invention.
Figure 5:
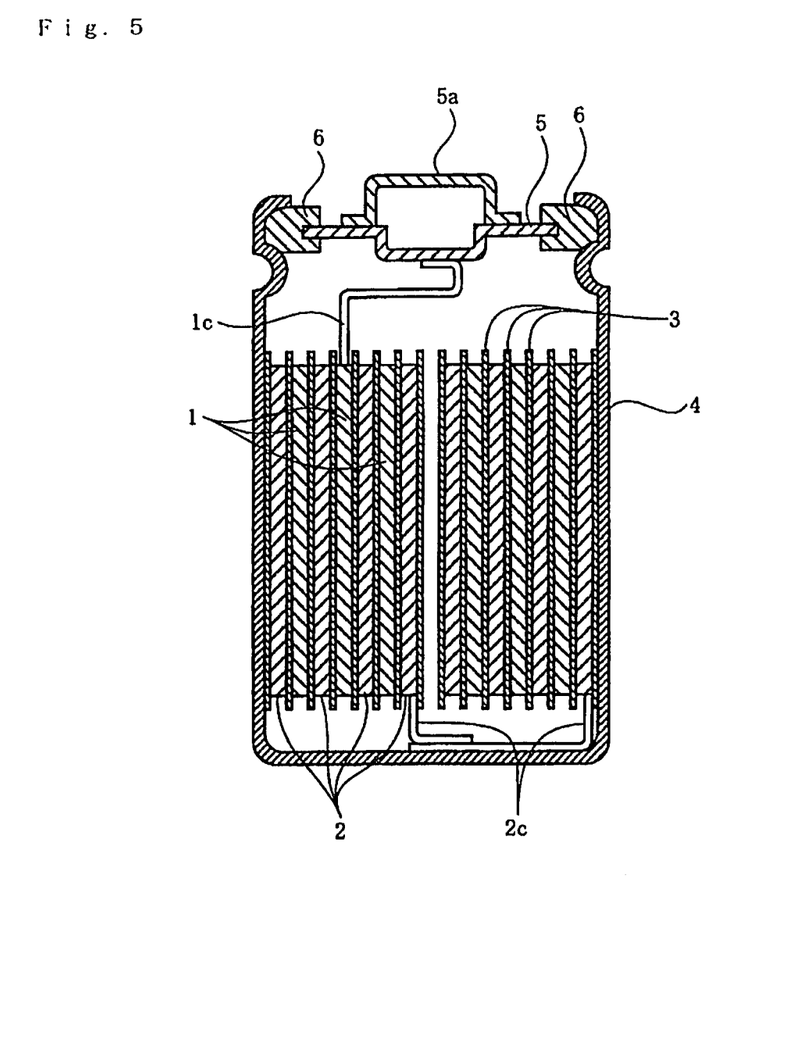
FIG. 5 is a schematic plan view illustrating a non-aqueous electrolyte secondary battery fabricated in Examples 6-10 of the present invention.

In Example 6, a non-aqueous electrolyte secondary battery was fabricated in the same manner as described in Example 1 above except for the following. The same non-aqueous electrolyte solution as described in Example 3 above was used. In preparing the negative electrode in a manner as described in Example 1, negative electrode current collector tabs 2c were attached to respective longitudinal ends of the negative electrode 2, in which the negative electrode mixture layer 2a was formed on both sides of the negative electrode current collector 2b, as illustrated in FIG. 4. These negative electrode current collector tabs 2c were connected to the battery can 4 so that the negative electrode current collector tabs 2c provided at both ends of the negative electrode 2 were positioned at the winding starting end and the winding terminating end, respectively, as illustrated in FIG. 5.

The specific resistance across the thickness of the positive electrode mixture layer of the positive electrode prepared in Example 6 was 0.53 Ω·m, which was the same as that of Example 1 above.

Example 7

In Example 7, a non-aqueous electrolyte secondary battery was fabricated in the same manner as described in Example 1 above except for the following. The same non-aqueous electrolyte solution as described in Example 3 above was used. The positive electrode and the negative electrode were prepared as described in Example 1, except for the following. In forming the positive electrode mixture layer on both sides of the positive electrode current collector, the amount of the positive electrode mixture applied per one side of the positive electrode current collector was controlled to be 90 g/m$^2$, so the amount of the positive electrode mixture applied on both sides of the positive electrode current collector was 180 g/m$^2$. In forming the negative electrode mixture layer on both sides of the negative electrode current collector, the amount of the negative electrode mixture applied per one side of the negative electrode current collector was controlled to be 35 g/m$^2$, so the amount of the negative electrode mixture applied on both sides of the negative electrode current collector was 70 g/m$^2$.

Then, as in the case of Example 6 above, negative electrode current collector tabs 2c were attached to respective longitudinal ends of the negative electrode 2, in which the negative electrode mixture layer 2a was formed on both sides of the negative electrode current collector 2b, and the negative electrode current collector tabs 2c provided at the respective ends of the negative electrode 2 were positioned at the winding starting end and the winding terminating end, respectively, to thus prepare the non-aqueous electrolyte secondary battery.

The specific resistance across the thickness of the positive electrode mixture layer of the positive electrode prepared in Example 7 was measured in the same manner as described in Example 1 above. As a result, the specific resistance was found to be 0.78 Ω·m, as shown in Table 1 below.

Example 8

In Example 8, a non-aqueous electrolyte secondary battery was fabricated in the same manner as described in Example 1 above except for the following. The same non-aqueous electrolyte solution as described in Example 3 above was used. The positive electrode and the negative electrode were prepared as described in Example 1, except for the following. In forming the positive electrode mixture layer on both sides of the positive electrode current collector, the amount of the positive electrode mixture applied per one side of the positive electrode current collector was controlled to be 110 g/m$^2$, so the amount of the positive electrode mixture applied on both sides of the positive electrode current collector was 220 g/m$^2$. In forming the negative electrode mixture layer on both sides of the negative electrode current collector, the amount of the negative electrode mixture applied per one side of the negative electrode current collector was controlled to be 45 g/m$^2$, so the amount of the negative electrode mixture applied on both sides of the negative electrode current collector was 90 g/m$^2$.

Then, as in the case of Example 6 above, negative electrode current collector tabs 2c were attached to respective longitudinal ends of the negative electrode 2, in which the negative electrode mixture layer 2a was formed on both sides of the negative electrode current collector 2b, and the negative electrode current collector tabs 2c provided at the respective ends of the negative electrode 2 were positioned at the winding starting end and the winding terminating end, respectively, to thus prepare the non-aqueous electrolyte secondary battery.

The specific resistance across the thickness of the positive electrode mixture layer of the positive electrode prepared in Example 8 was measured in the same manner as described in Example 1 above. As a result, the specific resistance was found to be 0.47 Ω·m, as shown in Table 1 below.

Example 9

In Example 9, a non-aqueous electrolyte secondary battery was fabricated in the same manner as described in Example 1 above except for the following. The same non-aqueous electrolyte solution as described in Example 3 above was used. The positive electrode and the negative electrode were prepared as described in Example 1, except for the following. In forming the positive electrode mixture layer on both sides of the positive electrode current collector, the amount of the positive electrode mixture applied per one side of the positive electrode current collector was controlled to be 120 g/m$^2$, so the amount of the positive electrode mixture applied on both sides of the positive electrode current collector was 240 g/m$^2$. In forming the negative electrode mixture layer on both sides of the negative electrode current collector, the amount of the negative electrode mixture applied per one side of the negative electrode current collector was controlled to be 50 g/m$^2$, so the amount of the negative electrode mixture applied on both sides of the negative electrode current collector was 100 g/m$^2$.

Then, as in the case of Example 6 above, negative electrode current collector tabs 2c were attached to respective longitudinal ends of the negative electrode 2, in which the negative electrode mixture layer 2a was formed on both sides of the negative electrode current collector 2b, and the negative electrode current collector tabs 2c provided at the respective ends of the negative electrode 2 were positioned at the winding starting end and the winding terminating end, respectively, to thus prepare the non-aqueous electrolyte secondary battery.

The specific resistance across the thickness of the positive electrode mixture layer of the positive electrode prepared in Example 9 was measured in the same manner as described in Example 1 above. As a result, the specific resistance was found to be 0.38 Ω·m, as shown in Table 1 below.

Example 10

In Example 10, a non-aqueous electrolyte secondary battery was fabricated in the same manner as described in Example 1 above except for the following. The same non-aqueous electrolyte solution as described in Example 3 above was used. The positive electrode and the negative electrode were prepared as described in Example 1, except for the following. In forming the positive electrode mixture layer on both sides of the positive electrode current collector, the amount of the positive electrode mixture applied per one side of the positive electrode current collector was controlled to be 125 g/m$^2$, so the amount of the positive electrode mixture applied on both sides of the positive electrode current collector was 250 g/m$^2$. In forming the negative electrode mixture layer on both sides of the negative electrode current collector, the amount of the negative electrode mixture, applied per one side of the negative electrode current collector was controlled to be 55 g/m$^2$, so the amount of the negative electrode mixture applied on both sides of the negative electrode current collector was 110 g/m$^2$.

Then, as in the case of Example 6 above, negative electrode current collector tabs 2c were attached to respective longitudinal ends of the negative electrode 2, in which the negative electrode mixture layer 2a was formed on both sides of the negative electrode current collector 2b, and the negative electrode current collector tabs 2c provided at the respective ends of the negative electrode 2 were positioned at the winding starting end and the winding terminating end, respectively, to thus prepare the non-aqueous electrolyte secondary battery.

The specific resistance across the thickness of the positive electrode mixture layer of the positive electrode prepared in Example 10 was measured in the same manner as described in Example 1 above. As a result, the specific resistance was found to be 0.53 Ω·m, as shown in Table 1 below.

Comparative Example 1

In Comparative Example 1, a non-aqueous electrolyte secondary battery was fabricated in the same manner as described in Example 1, except that the conductive agent contained only the carbon black having an average particle size of 50 nm, and that the weight ratio of the positive electrode active material, the carbon black, and the binder agent was 85:10:5.

The specific resistance across the thickness of the positive electrode mixture layer of the positive electrode prepared in Comparative Example 1 was measured in the same manner as described in Example 1 above. As a result, the specific resistance was found to be 1.05 Ω·m, as shown in Table 1 below.

Comparative Example 2

In Comparative Example 2, a non-aqueous electrolyte secondary battery was fabricated in the same manner as described in Example 1, except that the conductive agent contained only the carbon fiber having a fiber diameter of 150 nm and a fiber length of 15 μm, and that the weight ratio of the positive electrode active material, the carbon fiber, and the binder agent was 85:10:5.

The specific resistance across the thickness of the positive electrode mixture layer of the positive electrode prepared in Comparative Example 2 was measured in the same manner as described in Example 1 above. As a result, the specific resistance was found to be 1.20 Ω·m, as shown in Table 1 below.

Reference Example 1

In Reference Example 1, the positive electrode was prepared in the same manner as described in Example 1 except for the following. Lithium cobalt oxide LiCoO$_2$ was used as the positive electrode active material. The conductive agent contained only the carbon black having an average particle size of 50 nm. The weight ratio of the positive electrode active material, the carbon black, and the binder agent were mixed at a weight ratio of 85:10:5 to prepare a positive electrode mixture. In forming the positive electrode mixture layer on both sides of the positive electrode current collector using the prepared positive electrode mixture, the amount of the positive electrode mixture applied per one side of the positive electrode current collector was controlled to be 125 g/m$^2$, so the amount of the positive electrode mixture applied on both sides of the positive electrode current collector was 250 g/m$^2$.

A non-aqueous electrolyte secondary battery was fabricated in the same manner as described in Example 1 above except for the just-described modifications.

The specific resistance across the thickness of the positive electrode mixture layer of the positive electrode prepared in Reference Example 1 was measured in the same manner as described in Example 1 above. As a result, the specific resistance was found to be 0.05 Ω·m, as shown in Table 1 below.

Reference Example 2

In Reference Example 2, the positive electrode was prepared in the same manner as described in Example 1 except for the following. Lithium cobalt oxide LiCoO$_2$ was used as the positive electrode active material, as in Reference Example 1. The conductive agent contained only the carbon fiber having a fiber diameter of 150 nm and a fiber length of 15 μm. The positive electrode active material, the carbon fiber, and the binder agent were mixed at a weight ratio of 85:10:5 to prepare a positive electrode mixture. In forming the positive electrode mixture layer on both sides of the positive electrode current collector using the prepared positive electrode mixture, the amount of the positive electrode mixture applied per one side of the positive electrode current collector was controlled to be 125 g/m$^2$, so that the amount of the positive electrode mixture applied on both sides of the positive electrode current collector was 250 g/m$^2$.

A non-aqueous electrolyte secondary battery was fabricated in the same manner as described in Example 1 above except for the just-described modifications.

The specific resistance across the thickness of the positive electrode mixture layer of the positive electrode prepared in Reference Example 2 was measured in the same manner as described in Example 1 above. As a result, the specific resistance was found to be 0.03 Ω·m, as shown in Table 1 below.

Non-aqueous electrolyte secondary batteries of Examples 1 to 10 as well as Comparative Examples 1 and 2 fabricated in the above-described manners were subjected to an initial charge-discharge process at room temperature in the following manner. Each of the batteries was charged at a constant current of 1200 mA to 4.2 V and thereafter further charged at a constant voltage of 4.2 V until the current value reached 24 mA. Then, each of the batteries was rested for 10 minutes and thereafter discharged at a constant current of 1200 mA to 2.0 V.

Non-aqueous electrolyte secondary batteries of Reference Examples 1 and 2 were subjected to an initial charge-discharge process at room temperature in the following manner. Each of the batteries was charged at a constant current of 1700 mA to 4.2 V and thereafter further charged at a constant voltage of 4.2 V until the current value reached 34 mA. Then, each of the batteries was rested for 10 minutes and thereafter discharged at a constant current of 1700 mA to 2.5 V.

The positive electrodes were taken out from the non-aqueous electrolyte secondary batteries of Examples 1 to 6, 9, and 10, and Comparative Examples 1, 2 and Reference Example 1 that were subjected to the just-described initial charge-discharge processes, and for each positive electrode, the positive electrode thickness increase (%) of the positive electrode after the initial charge-discharge process with respect to the positive electrode thickness before the initial charge-discharge process was obtained. The results are shown in Table 1 below.

TABLE 1

| | Positive electrode mixture layer | | | | | |
|---|---|---|---|---|---|---|
| | Positive electrode active material | Carbon black | Carbon fiber | Amount applied per one side | Specific resistance | $LiPF_6$ concentration (mol/L) | Positive electrode thickness increase |
| Ex. 1 | $LiFePO_4$ | 5 wt. % | 5 wt. % | 100 g/m² | 0.53 Ω·m | 1.6 | 6% |
| Ex. 2 | $LiFePO_4$ | 3 wt. % | 7 wt. % | 100 g/m² | 0.68 Ω·m | 1.6 | 6% |
| Ex. 3 | $LiFePO_4$ | 5 wt. % | 3 wt. % | 100 g/m² | 0.96 Ω·m | 1.0 | 5% |
| Ex. 4 | $LiFePO_4$ | 3 wt. % | 5 wt. % | 100 g/m² | 0.96 Ω·m | 1.0 | 6% |
| Ex. 5 | $LiFePO_4$ | 5 wt. % | 5 wt. % | 100 g/m² | 0.53 Ω·m | 1.0 | 6% |
| Ex. 6 | $LiFePO_4$ | 5 wt. % | 5 wt. % | 100 g/m² | 0.53 Ω·m | 1.0 | 6% |
| Ex. 7 | $LiFePO_4$ | 5 wt. % | 5 wt. % | 90 g/m² | 0.78 Ω·m | 1.0 | — |
| Ex. 8 | $LiFePO_4$ | 5 wt. % | 5 wt. % | 110 g/m² | 0.47 Ω·m | 1.0 | — |
| Ex. 9 | $LiFePO_4$ | 5 wt. % | 5 wt. % | 120 g/m² | 0.38 Ω·m | 1.0 | 7% |
| Ex. 10 | $LiFePO_4$ | 5 wt. % | 5 wt. % | 125 g/m² | 0.53 Ω·m | 1.0 | 7% |
| Comp. Ex. 1 | $LiFePO_4$ | 10 wt. % | 0 wt. % | 100 g/m² | 1.05 Ω·m | 1.0 | 4% |
| Comp. Ex. 2 | $LiFePO_4$ | 0 wt. % | 10 wt. % | 100 g/m² | 1.20 Ω·m | 1.0 | 7% |
| Ref. Ex. 1 | $LiCoO_2$ | 10 wt. % | 0 wt. % | 125 g/m² | 0.05 Ω·m | 1.6 | 0% |
| Ref. Ex. 2 | $LiCoO_2$ | 0 wt. % | 10 wt. % | 125 g/m² | 0.03 Ω·m | 1.6 | — |

As is evident from Table 1, the non-aqueous electrolyte secondary batteries of Examples 1 to 10 and Comparative Examples 1 and 2, which employed $LiFePO_4$ as the positive electrode active material, showed significantly higher specific resistances of the positive electrode mixture layer than the non-aqueous electrolyte secondary batteries of Reference Examples 1 and 2, which employed $LiCoO_2$ as the positive electrode active material.

In addition, the non-aqueous electrolyte secondary battery of Reference Example 1, which employed $LiCoO_2$ as the positive electrode active material, showed little change in the positive electrode thickness before and after the initial charge-discharge process. On the other hand, the non-aqueous electrolyte secondary batteries of Examples 1 to 6, 9, 10, and Comparative Examples 1 and 2, which employed $LiFePO_4$ as the positive electrode active material, showed increases in the positive electrode thickness after the initial charge-discharge process. This demonstrates that, in the non-aqueous electrolyte secondary batteries that use carbon particles, such as that of Example 1, there is a risk that conductive paths are disconnected in the case that the conductive paths are formed by the carbon particles. It should also be noted that the non-aqueous electrolyte secondary batteries of Examples 7 and 8, which used $LiFePO_4$ as the positive electrode active material, showed increases in the positive electrode thickness after the initial charge-discharge process as in the foregoing cases.

A comparison between the non-aqueous electrolyte secondary batteries of Example 1 to 10 and Comparative Examples 1 and 2, all of which employed $LiFePO_4$ as the positive electrode active material, demonstrates the following. Comparative Example 1, which used only the carbon black as the conductive agent, showed a lower specific resistance of the positive electrode mixture layer than that of Comparative Example 2, which used only the carbon fiber as the conductive agent. Moreover, Examples 1 to 10, each of which employed a mixture of carbon black and carbon fiber, showed further lower specific resistances of the positive electrode mixture layer. In contrast, the non-aqueous electrolyte secondary batteries of Reference Examples 1 and 2, which used $LiCoO_2$ as the positive electrode active material, showed little difference in the specific resistance of the positive electrode mixture layer between the case in which the carbon black was used as the conductive agent and the case in which the carbon fiber was used as the conductive agent.

These results are believed to indicate that the use of a mixture of carbon particles and carbon fiber for the conductive agent serves to reduce the specific resistance of the positive electrode mixture layer, and that this effect is unique to the positive electrode that employs an olivine-type lithium iron phosphate ($LiFePO_4$) as the positive electrode active material.

Next, at room temperature, the average operating voltage for each of the non-aqueous electrolyte secondary batteries of Examples 1 to 10 and Comparative Examples 1 and 2 was determined in the following manner. These non-aqueous electrolyte secondary batteries, which had been subjected to the above-described initial charge-discharge processes, were charged at a constant current of 1200 mA to 4.2 V and then further charged at a constant voltage of 4.2 V until the current value reached 24 mA. Then, after resting for 10 minutes, each of the batteries was discharged at a constant current of 10 A to 2.0 V, to obtain the average operating voltage during the high current discharge at 10 A for each battery. The results are shown in Table 2.

In addition, the non-aqueous electrolyte secondary batteries of Examples 1, 2, 5 to 10 as well as Comparative Examples 1 and 2 that had been subjected to the above-described initial charge-discharge processes were charged at a constant current of 1200 mA to 4.2 V and thereafter further charged at a constant voltage of 4.2 V until the current value reached 24 mA. After resting for 10 minutes, the batteries were discharged at a constant current of 10 A to 2.0 V. This charge-discharge cycle was repeated 100 times at room temperature.

Then, the capacity retention rate, defined as the ratio of discharge capacity Q100 at the 100th cycle to initial discharge capacity Q1, was obtained for each of the non-aqueous electrolyte secondary batteries of Examples 1, 2, 5 to 10 as well as Comparative Examples 1 and 2, according to the following equation. The results are shown in Table 2 below.

Capacity retention ratio (%)=(Q100/Q1)×100

Figure 6:
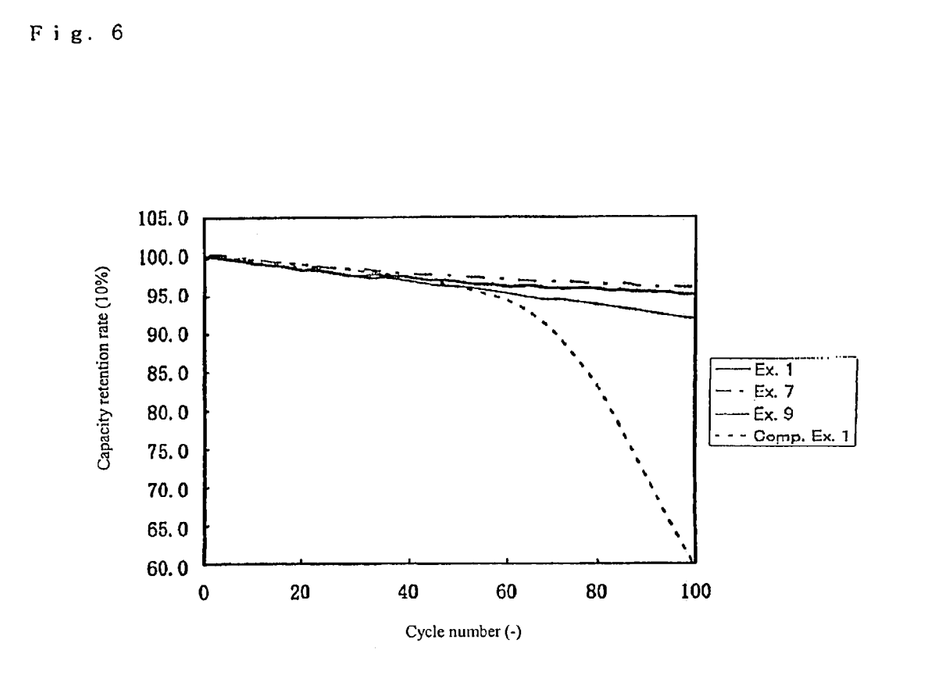
FIG. 6 is a graph illustrating number of charge-discharge cycles versus capacity retention ratio of the non-aqueous electrolyte secondary batteries of Examples 1, 7 and 9 of the present invention and Comparative Example 1, when the batteries were charged and discharged repeatedly with discharge being at a high current.

The changes of capacity retention ratios versus numbers of charge-discharge cycles were obtained for the non-aqueous electrolyte secondary batteries of Examples 1, 7, 9, and Comparative Example 1. The results are shown in FIG. 6. In FIG. 6, the result for the non-aqueous electrolyte secondary battery of Example 1 is represented by the bold solid line, the result for the non-aqueous electrolyte secondary battery of Example 7 is represented by the dot-dashed line, the result for the non-aqueous electrolyte secondary battery of Example 9 is represented by the thin solid line, and the result for the non-aqueous electrolyte secondary battery of Comparative Example 1 is represented by the dashed line.

TABLE 2

| | Positive electrode mixture layer | | | | | |
|---|---|---|---|---|---|---|
| | Positive electrode active material | Carbon black | Carbon fiber | Amount applied per one side | Number of negative electrode current collector tab | Average operating voltage | Capacity retention ratio |
| Ex. 1 | $LiFePO_4$ | 5 wt. % | 5 wt. % | 100 g/$m^2$ | 1 | 2.81 V | 95.0% |
| Ex. 2 | $LiFePO_4$ | 3 wt. % | 7 wt. % | 100 g/$m^2$ | 1 | 2.81 V | 97.3% |
| Ex. 3 | $LiFePO_4$ | 5 wt. % | 3 wt. % | 100 g/$m^2$ | 1 | 2.84 V | — |
| Ex. 4 | $LiFePO_4$ | 3 wt. % | 5 wt. % | 100 g/$m^2$ | 1 | 2.85 V | — |
| Ex. 5 | $LiFePO_4$ | 5 wt. % | 5 wt. % | 100 g/$m^2$ | 1 | 2.84 V | 90.0% |
| Ex. 6 | $LiFePO_4$ | 5 wt. % | 5 wt. % | 100 g/$m^2$ | 2 | 2.87 V | 94.4% |
| Ex. 7 | $LiFePO_4$ | 5 wt. % | 5 wt. % | 90 g/$m^2$ | 2 | 2.85 V | 95.9% |
| Ex. 8 | $LiFePO_4$ | 5 wt. % | 5 wt. % | 110 g/$m^2$ | 2 | 2.89 V | 94.5% |
| Ex. 9 | $LiFePO_4$ | 5 wt. % | 5 wt. % | 120 g/$m^2$ | 2 | 2.85 V | 91.7% |
| Ex. 10 | $LiFePO_4$ | 5 wt. % | 5 wt. % | 125 g/$m^2$ | 2 | 2.88 V | 90.8% |
| Comp. Ex. 1 | $LiFePO_4$ | 10 wt. % | 0 wt. % | 100 g/$m^2$ | 1 | 2.78 V | 59.6% |
| Comp. Ex. 2 | $LiFePO_4$ | 0 wt. % | 10 wt. % | 100 g/$m^2$ | 1 | 2.70 V | 97.2% |

The results demonstrate that, of the non-aqueous electrolyte secondary batteries of Examples 1 to 10 and Comparative Examples 1 and 2, which employed $LiFePO_4$ as the positive electrode active material, the non-aqueous electrolyte secondary batteries of Examples 1 to 10, each of which employed a mixture of the carbon black and the carbon fiber as the conductive agent of the positive electrode mixture layer, exhibited significant improvements in average operating voltage over the non-aqueous electrolyte secondary battery of Comparative Example 2, which used only the carbon fiber as the conductive agent of the positive electrode mixture layer.

Moreover, the non-aqueous electrolyte secondary batteries of Example 1, 2, and 5 to 10, each of which employed a mixture of the carbon black and the carbon fiber as the conductive agent of the positive electrode mixture layer, exhibited significant improvements in capacity retention ratio over the non-aqueous electrolyte secondary battery of Comparative Example 1, which used only the carbon black as the conductive agent of the positive electrode mixture layer, when cycled repeatedly with a high current discharge at 10 A.

In addition, the non-aqueous electrolyte secondary batteries of Examples 3 and 4, in which the total amount of the conductive agent made of the carbon black and the carbon fiber was 8 wt. % in the positive electrode mixture layer, showed nearly the same average operating voltages as that of the non-aqueous electrolyte secondary battery of Example 5, in which the total amount of the carbon black and the carbon fiber was 10 wt. %. This demonstrates that the same advantageous effects can be obtained even when the amount of the conductive agent is less.

Furthermore, a comparison between the non-aqueous electrolyte secondary batteries of Examples 6 to 10 suggests the following. As the amount of the positive electrode mixture applied increases, the non-uniformity in the reactions across the thickness tend be greater, and consequently, the capacity retention ratio tends to deteriorate. The non-aqueous electrolyte secondary batteries of Examples 9 and 10, in which the amount of the positive electrode mixture applied was 120 g $m^2$ or greater (240 g $m^2$ or greater for both sides), showed considerable deteriorations in capacity retention ratio. Accordingly, it is believed preferable that the amount of the positive electrode mixture applied per one side be 115 g/$m^2$ or less (230 g/$m^2$ for both sides).

In addition, a comparison between the non-aqueous electrolyte secondary batteries of Examples 5 and 6, in which the numbers of the negative electrode current collector tabs provided for the negative electrodes were varied, demonstrates the following. The non-aqueous electrolyte secondary battery of Example 6, in which the negative electrode current collector tabs were disposed respectively at the winding starting end and the winding terminating end, showed a decrease in battery internal resistance and a suppressed reaction non-uniformity and consequently exhibited a higher average operating voltage and a greater capacity retention ratio than the non-aqueous electrolyte secondary battery of Example 5, in which a negative electrode current collector tab was disposed only at the winding terminating end part.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese Patent Application Nos. 2006-285283 and 2006-350735 filed Oct. 19 and Dec. 27, 2006, respectively, each of which is incorporated herein by reference.

What is claimed:

1. A non-aqueous electrolyte secondary battery comprising:
 a negative electrode comprising graphite as a negative electrode active material;
 a non-aqueous electrolyte; and
 a positive electrode having a positive electrode mixture layer comprising a positive electrode active material, a binder agent, and a conductive agent, wherein:
 the positive electrode active material of the positive electrode mixture layer comprises an olivine-type lithium-containing metal phosphate represented by the general formula $Li_xMPO_4$, where M is at least one element selected from the group consisting of Co, Ni, Mn, and Fe, and x is $0 \leq x \leq 1.3$; and
 the conductive agent of the positive electrode mixture layer comprises a mixture of carbon particles and carbon fiber, wherein the carbon particles are carbon black; the carbon fiber has a diameter of 50-300 nm, a length of 5-100 μm and a specific surface area of 30 $m^2$/g or less, and the amount of the carbon particles in the conductive agent is within the range of from 2 wt. % to 8 wt. % with respect to the total weight of the positive electrode mixture layer.

2. The non-aqueous electrolyte secondary battery according to claim 1, wherein the olivine-type lithium-containing metal phosphate is an olivine-type lithium iron phosphate represented by the general formula $Li_xFePO_4$, where $0<x<1.3$.

3. The non-aqueous electrolyte secondary battery according to claim 1, wherein the amount of the conductive agent is within the range of from 5 wt. % to 20 wt. % with respect to the total weight of the positive electrode mixture layer.

4. The non-aqueous electrolyte secondary battery according to claim 2, wherein the amount of the conductive agent is within the range of from 5 wt. % to 20 wt. % with respect to the total weight of the positive electrode mixture layer.

5. The non-aqueous electrolyte secondary battery according to claim 1, wherein the positive electrode mixture layer is coated on a positive electrode current collector, and the amount of the positive electrode mixture applied per one side of the positive electrode current collector is within the range of from 70 g/$m^2$ to 125 g/$m^2$.

6. The non-aqueous electrolyte secondary battery according to claim 2, wherein the positive electrode mixture layer is coated on a positive electrode current collector, and the amount of the positive electrode mixture applied per one side of the positive electrode current collector is within the range of from 70 g/$m^2$ to 125 g/$m^2$.

7. The non-aqueous electrolyte secondary battery according to claim 3, wherein the positive electrode mixture layer is coated on a positive electrode current collector, and the amount of the positive electrode mixture applied per one side of the positive electrode current collector is within the range of from 70 g/$m^2$ to 125 g/$m^2$.

8. The non-aqueous electrolyte secondary battery according to claim 4, wherein the positive electrode mixture layer is coated on a positive electrode current collector, and the amount of the positive electrode mixture applied per one side of the positive electrode current collector is within the range of from 70 g/$m^2$ to 125 g/$m^2$.

9. The non-aqueous electrolyte secondary battery according to claim 1, wherein the amount of the positive electrode mixture applied per one side of the positive electrode current collector is within the range of from 80 g/$m^2$ to 115 g/$m^2$.

10. The non-aqueous electrolyte secondary battery according to claim 2, wherein the amount of the positive electrode mixture applied per one side of the positive electrode current collector is within the range of from 80 g/$m^2$ to 115 g/$m^2$.

11. The non-aqueous electrolyte secondary battery according to claim 3, wherein the amount of the positive electrode mixture applied per one side of the positive electrode current collector is within the range of from 80 g/$m^2$ to 115 g/$m^2$.

12. The non-aqueous electrolyte secondary battery according to claim 1, wherein at least one current collector tab is attached to each of the positive electrode and the negative electrode, and two or more current collector tabs are attached to at least one of the positive electrode and the negative electrode.

13. The non-aqueous electrolyte secondary battery according to claim 2, wherein at least one current collector tab is attached to each of the positive electrode and the negative electrode, and two or more current collector tabs are attached to at least one of the positive electrode and the negative electrode.

14. The non-aqueous electrolyte secondary battery according to claim 3, wherein at least one current collector tab is attached to each of the positive electrode and the negative electrode, and two or more current collector tabs are attached to at least one of the positive electrode and the negative electrode.

15. The non-aqueous electrolyte secondary battery according to claim 12, wherein the positive electrode and the negative electrode are wound together with a separator interposed therebetween to form a winding, and two current collector tabs are attached to two respective portions of the negative electrode, one portion being a starting end of the negative electrode in the winding and the other being a terminating end of the negative electrode in the winding.

16. The non-aqueous electrolyte secondary battery according to claim 13, wherein the positive electrode and the negative electrode are wound together with a separator interposed therebetween, and two current collector tabs are attached to two respective portions of the negative electrode, one portion being a starting end of the negative electrode in the winding and the other being a terminating end of the negative electrode in the winding.

17. The non-aqueous electrolyte secondary battery according to claim 14, wherein the positive electrode and the negative electrode are wound together with a separator interposed therebetween, and two current collector tabs are attached to two respective portions of the negative electrode, one portion being a starting end of the negative electrode in the winding and the other being a terminating end of the negative electrode in the winding.

* * * * *